(12) United States Patent
Ryan et al.

(10) Patent No.: US 7,654,092 B2
(45) Date of Patent: Feb. 2, 2010

(54) SYSTEM FOR MODULATING FUEL SUPPLY TO INDIVIDUAL FUEL NOZZLES IN A CAN-ANNULAR GAS TURBINE

(75) Inventors: William R. Ryan, Oviedo, FL (US); Ernest W. Smith, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 556 days.

(21) Appl. No.: 11/488,562

(22) Filed: Jul. 18, 2006

(65) Prior Publication Data
US 2008/0016875 A1    Jan. 24, 2008

(51) Int. Cl.
*F02C 9/22* (2006.01)
*F02C 9/34* (2006.01)
(52) U.S. Cl. .......................... 60/776; 60/39.281; 60/734
(58) Field of Classification Search .................... 60/772, 60/776, 734, 39.281
See application file for complete search history.

(56) References Cited

U.S. PATENT DOCUMENTS

| | | | |
|---|---|---|---|
| 5,319,931 A | 6/1994 | Beebe et al. | |
| 5,365,732 A | 11/1994 | Correa | |
| 5,487,275 A | 1/1996 | Borkowicz et al. | |
| 5,491,970 A | 2/1996 | Davis, Jr. et al. | |
| 5,575,144 A | 11/1996 | Brough | |
| 6,059,560 A | 5/2000 | Richards et al. | |
| 6,361,754 B1 | 3/2002 | Peter-Hoblyn et al. | |
| 6,751,942 B2 | 6/2004 | Mahoney et al. | |
| 6,786,049 B2 | 9/2004 | Parsons et al. | |
| 6,810,655 B2 | 11/2004 | Davis, Jr. et al. | |
| 6,817,186 B2 | 11/2004 | Tanaka | |
| 6,865,935 B2 | 3/2005 | Vandervort | |
| 7,188,465 B2 * | 3/2007 | Kothnur et al. | 60/39.281 |
| 7,269,939 B2 * | 9/2007 | Kothnur et al. | 60/39.281 |
| 2003/0037536 A1 * | 2/2003 | Aoyama | 60/39.281 |
| 2003/0144787 A1 * | 7/2003 | Davis et al. | 701/100 |
| 2004/0168520 A1 | 9/2004 | Gleeson et al. | |
| 2005/0198964 A1 * | 9/2005 | Myers et al. | 60/739 |

FOREIGN PATENT DOCUMENTS

| | | |
|---|---|---|
| GB | 347019 | 5/1930 |
| GB | 377305 | 1/1931 |
| JP | 58205019 A | 11/1983 |

* cited by examiner

*Primary Examiner*—Ted Kim

(57) ABSTRACT

A fuel modulation system usable in can-annular combustor systems of turbine engines for more efficiently managing fuel flow to reduce the amount of $NO_x$ while maintaining appropriate combustor flame temperatures. The fuel modulation system controls individual inline modulation valves in cooperation with a overall stage control valve to bring a turbine engine through the startup phase and to maintain operating conditions at a load set point while reducing $NO_x$ variability between baskets by using individual combustor dynamic pressure measurements. The fuel modulation system may be managed such that individual inline modulation valves remain within a predetermined range of positions relative to a nominal position to reduce $NO_x$ variability.

14 Claims, 2 Drawing Sheets

SYSTEM FOR MODULATING FUEL SUPPLY TO INDIVIDUAL FUEL NOZZLES IN A CAN-ANNULAR GAS TURBINE

FIELD OF THE INVENTION

This invention is directed generally to fuel supply systems, and more particularly to fuel supply systems for can-annular gas turbine engines.

BACKGROUND

In a can-annular gas turbine combustor, differences in air and fuel flow between combustor baskets produce differences in the dynamic pressure and $NO_x$ emissions. Typically, dynamic pressure and $NO_x$ emissions vary inversely such that as a combustion system is tuned to reduce $NO_x$ emissions, dynamic pressure increases. In a traditional dry low $NO_x$ (DLN) combustion system, there are four stages: an upstream premixing stage, a non-premixed pilot stage and two main premixing stages. Because the pilot flame burns as a high temperature diffusion flame, the production of $NO_x$ and the amount of dynamic pressure in a combustor basket are closely related to the pilot fuel fraction. Ideally, all of the fuel would be premixed prior to being introduced into the combustor basket to reduce $NO_x$ production. However, maintaining stable combustion in a combustor basket is very difficult to achieve without having a relatively high temperature region, typically referred to as the pilot region, that produces a relatively high amount of $NO_x$.

One conventional system, which is a SIEMENS fuel system known as ACDMS, controls fuel flow to the pilot diffusion stage with a set of rules designed to optimize $NO_x$ production and operate the engine within dynamic limits. The dynamic pressure is measured in all combustor baskets in specific frequency ranges and the peak pressure value out of all the combustor baskets is used to adjust the fuel flow to the pilot diffusion stage. Hence, the operation of the gas turbine is based on the worst basket from a dynamic pressure perspective and the best basket from a $NO_x$ production perspective. Because the individual combustor fuel supply lines are connected to a common fuel manifold, adjusting the system based upon the peak combustor basket with the highest dynamic levels brings the peak combustor back within dynamic limits, however, the system is not optimized as other combustors are operating below the dynamic limits leaving unused margin for $NO_x$ optimization in the other combustor baskets. As a result, such decrease in $NO_x$ is not as large as it could be. Thus, a need exists for a more efficient manner of controlling pilot nozzle fuel flow such that dynamic pressures are within an acceptable range and $NO_x$ production is limited as much as possible.

SUMMARY OF THE INVENTION

This invention is directed to a fuel modulation system usable in can-annular combustor systems of turbine engines for more efficiently managing fuel flow to pilot nozzles to reduce the amount of $NO_x$ produced while maintaining appropriate combustor flame temperatures. The fuel modulation system may control individual inline modulation valves in cooperation with an overall stage control valve to bring a turbine engine through the startup phase and to maintain operating conditions at a load set point while reducing $NO_x$ variability between baskets by using individual combustor dynamic pressure measurements.

The fuel modulation system may include at least one overall stage control valve positioned upstream from a turbine fuel manifold in a turbine engine fuel system and a plurality of fuel nozzles in fluid communication with the at least one overall stage control valve and positioned downstream of the turbine fuel manifold. The plurality of fuel nozzles may be positioned in the fuel system to inject fuel into a plurality of can-annular combustor baskets. The fuel modulation system may also include an inline modulation valve upstream of each of the plurality of fuel nozzles for controlling the fuel flow to each of the nozzles. The fuel modulation system may also include a control module for controlling the inline modulation valves such as for controlling opening the inline modulation valves.

During operation, the inline modulation valves may be usable to make the fuel flow to the fuel nozzles more uniform. Before starting a turbine engine, the inline modulation valves may be moved to a substantially fully opened position. The turbine engine is started and at least one overall stage control valve may be modulated during startup of the can-annular turbine engine according to methods known in the art. Once the can-annular turbine engine is operating at a load set point, the inline modulation valves may be closed at a regulated rate until the inline modulation valves reach a desired nominal position. The control module may calculate a peak dynamic pressure level for each of the combustor baskets during a predetermined time period. The control module may also calculate an average peak dynamic pressure level for all of the combustor baskets. The control module may determine whether a combustor basket has a peak dynamic pressure level other than the average peak dynamic pressure level. If the combustor basket peak dynamic pressure level is greater than the average of all the combustor peak dynamic pressure levels for the fuel nozzle, then the fuel nozzle is moved toward the full open position until the combustor peak dynamic pressure level is substantially equal to the engine average peak dynamic pressure level. If the peak dynamic pressure level is less than the average peak dynamic pressure level for the fuel nozzle, then the fuel nozzle is moved toward the closed position until the peak dynamic pressure level is substantially equal to the average peak dynamic pressure level.

The engine fuel modulation system may also prevent drift of the inline modulation valves away from the starting nominal position. In one embodiment, the control module may calculate an average position of the inline modulation valves and compare that value to nominal starting positions of the inline modulation valves. The position of the inline modulation valves may be adjusted if the average position of the inline modulation valves is other than equal to the nominal starting position of the inline modulation valves. For instance, if the average position of the inline modulation valves is greater than the nominal starting position of the inline modulation valve, then the inline modulation valve may be adjusted to move the nominal position downward. In other words, all inline modulation valves may be adjusted to restore the original nominal average position with the overall stage valve adjusting to maintain the desired overall fuel flow to all combustor baskets for that stage. If the average position of the inline modulation valves is less than the nominal starting position of the inline modulation valves, then the inline modulation valve may be adjusted to move the average nominal value position upward. The fuel modulation system may also include an alarm, such as an audible or visual alarm, configured to activate if the average position of the inline modulation valves moves outside of an allowable range of positions around the nominal inline modulation valve position. The alarm may also be configured to identify any condition in which a single valve moves outside of a predetermined allowable range.

An advantage of this invention is that the fuel flow to each combustor basket in a can-annular combustor arrangement may be independently monitored and adjusted to reduce the production of $NO_x$ while maintaining appropriate combustor flame temperatures and while the overall stage fuel flow is controlled independently through another logic set and another single valve common to all combustor baskets. The control logic for this valve may also limit the maximum dynamic pressure level of the engine. Thus, the overall stage control valve may operate to control the overall dynamic level, while the individual valves may operate to make the level more uniform between combustor baskets.

Another advantage of this invention is that the fuel flow to a pilot nozzle in each combustor basket may be adjusted independently of the fuel flow to pilot nozzles in other combustor baskets.

Yet another advantage of this invention is that the production of $NO_x$ may be reduced relative to conventional fuel supply systems while maintaining the same operating conditions in the combustor baskets.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
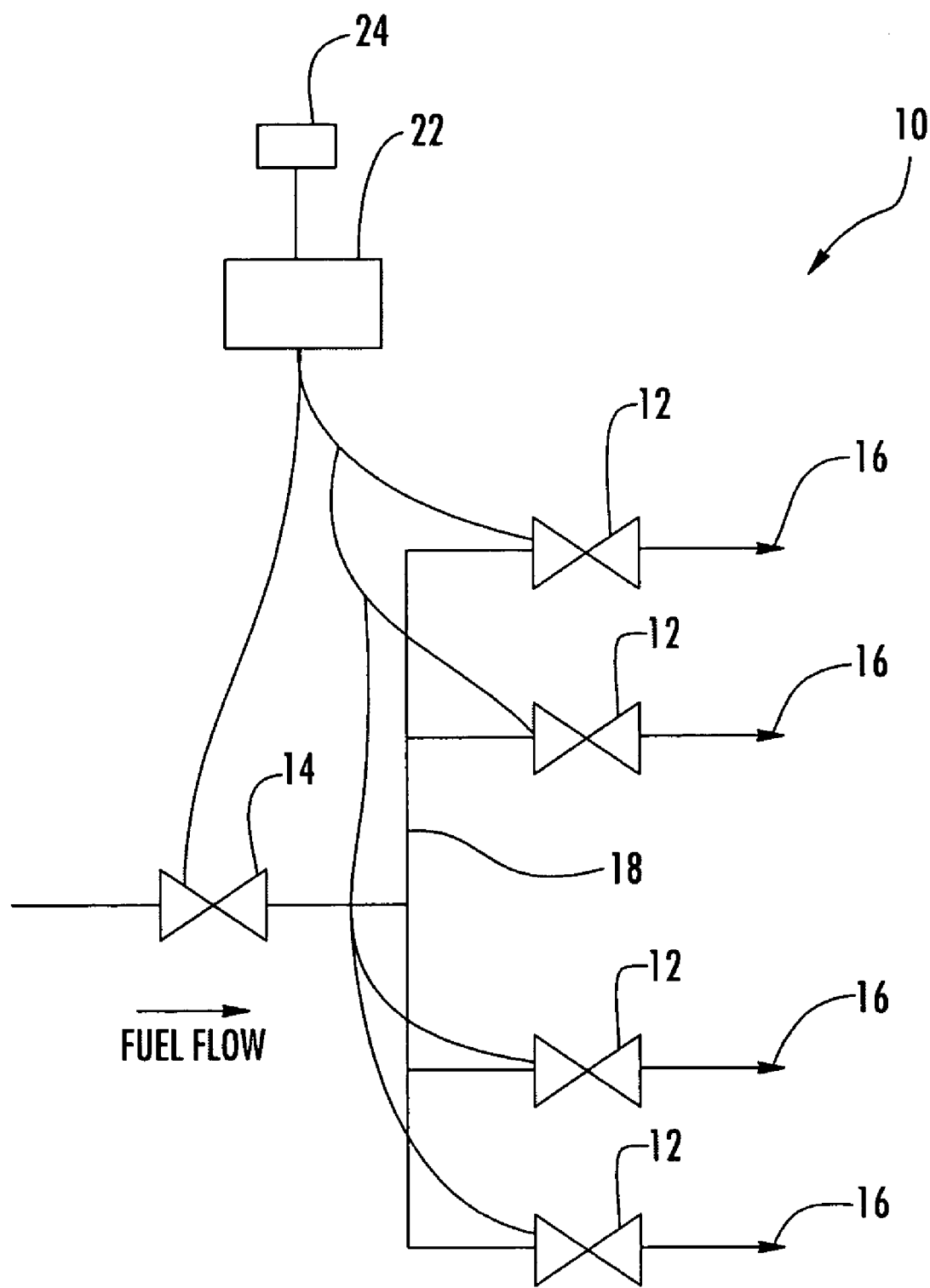
FIG. 1 is a schematic diagram of the fuel modulation system of the invention.
Figure 2:
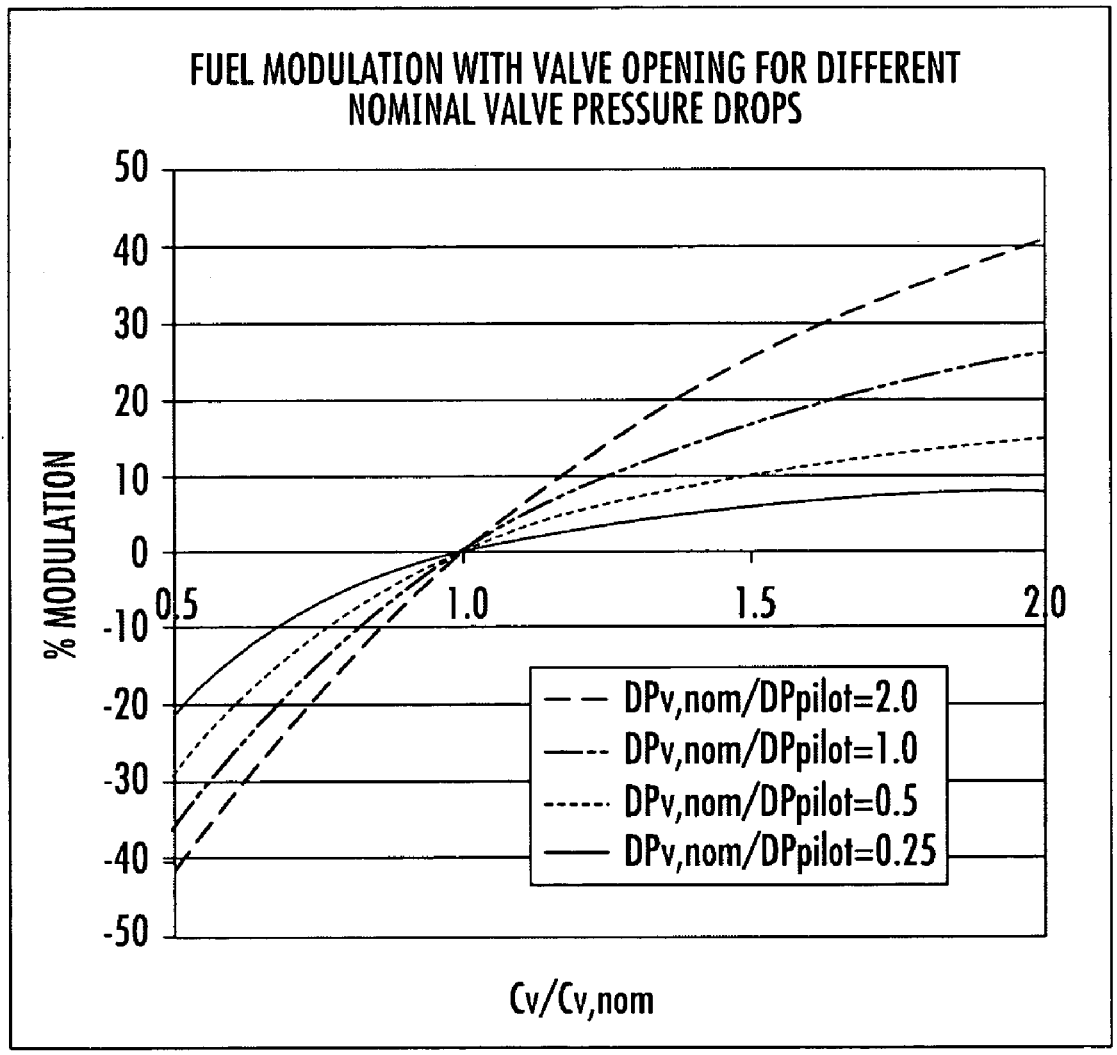
FIG. 2 is graph of predicted fuel modulation as a function of a valve coefficient.

As shown in FIGS. 1-2, the invention is directed to a fuel modulation system 10. The fuel modulation system 10 may be usable in can-annular combustor systems of turbine engines for more efficiently managing fuel flow to reduce the amount of $NO_x$ while maintaining appropriate combustor flame temperatures. The fuel modulation system 10 controls individual inline modulation valves 12 in cooperation with a overall stage control valve 14 to bring a turbine engine through the startup phase and to maintain operating conditions at a load set point while reducing $NO_x$ variability between baskets by using individual combustor dynamic pressure measurements.

The fuel modulation system 10 may include a plurality of inline modulation valves 12 positioned inline in individual pilot fuel feed lines between fuel nozzles 16 and a turbine fuel manifold 18. The turbine fuel manifold 18 may be in fluid communication with the fuel nozzles 16 and the overall stage control valve 14. In addition, the turbine fuel manifold 18 may be positioned downstream from the overall stage control valve 14 and upstream from the inline modulation valves 12 in the fuel modulation system 10. In at least one embodiment, one or more fuel nozzles 16 may be positioned in each of a plurality of combustor baskets forming a conventional can-annular combustion basket assembly. The fuel nozzles 16 may be any conventional nozzle and may be positioned in the combustion baskets in any conventional manner or other appropriate manner. The overall stage control valve 14 may control the flow of fuel to the inline modulation valves 12.

The fuel modulation system 10 may reduce $NO_x$ variability between baskets by using individual combustor dynamic pressure measurements to control the inline modulation valves 12. In particular, the fuel modulation system 10 may control overall fuel flow to a pilot diffusion stage at the turbine fuel manifold 18 through use of the overall stage control valve 14. The fuel flow to the individual fuel nozzles 16 may be controlled by the inline modulation valves 12. Control of the fuel flow through the overall stage control valve 14 may be controlled using conventional systems known to those of ordinary skill in the art, such as the SIEMENS ACDMS system, which may provide engine protection as well. Alternatively, the overall stage control valve 14 may be controlled according to preset fuel fractions such as typically used with SIEMENS DLN combustion systems. The fuel modulation system 10 may be used to control a diffusion pilot flow in a fuel system, a premixed pilot flow in the DLN++ system, or any other stage as appropriate in multistage combustion systems.

In one embodiment of the invention, the inline modulation valves 12 may be sized such that when the modulation valves 12 are modulating fuel flow at higher loads and lower pilot fractions, the modulation valves 12 are positioned substantially in the middle of the range of valve motion such that the modulation valves 12 can provide modulation up or down (toward open or toward closed positions) dependent on the individual basket dynamics. A nominal valve position may vary depending on the turbine engine in which the fuel modulation system 10 is installed. Nonetheless, the inline modulation valves 12 should be configured such that a nominal valve position may be identified that is in a portion of the valve coefficient curve (Cv) where the inline modulation valve 12 may be modulated without large or small changes in valve Cv, as shown in FIG. 2. It has been determined that during low pilot flow operation, such as when the turbine engine is under a high load and produces relatively small amounts of $NO_x$ and the pressure drop across the pilot is low, the nominal valve position of an inline modulation valve 12 results in a pressure drop across the inline modulation valve 12 generally on the same order of magnitude as the pressure drop across the pilot. If the pressure drop across the inline modulation valve 12 is too high, undesirable fuel flow fluctuations result from small changes in the position of the inline modulation valve 12. If the pressure drop across the inline modulation valve 12 is too low, undesirable large changes in position of the inline modulation valve 12 are necessary to modulate fuel flow. It is desirable that during low load operation, the inline modulation valve 12 be fully open to minimize pressure drop across the inline modulation valve 12 because the pressure drop across the fuel nozzle 16 is high and the fuel flow is limited by available supply pressure.

During operation, the inline modulation valves 12 are usable to make the fuel flow to the fuel nozzles 16 more uniform. Before starting a turbine engine, the inline modulation valves 12 are moved to a substantially fully opened position. The turbine engine is started and the at least one overall stage control valve 14 is modulated during startup of the can-annular turbine engine according to methods known in the art. Once the can-annular turbine engine is operating at a load set point, the inline modulation valves 12 may be closed at a regulated rate until the inline modulation valves reach a desired nominal position. In at least one embodiment, the regulated rate at which the inline modulation valves 12 close is about two minutes. The fuel modulation system 10 may also include a control module 22. The control module 22 may calculate an individual average peak dynamic pressure level for each of the combustor baskets during a predetermined time period, such as a time period of between about ten seconds and about sixty seconds. The control module 22 may also calculate an overall average of the individual average peak dynamic pressure levels. The control module 22 may determine whether a fuel nozzle 16 in combustor basket has an average individual peak dynamic pressure level other than the overall average peak dynamic pressure level. If the individual peak dynamic pressure level is greater than the average peak dynamic pressure level for the fuel nozzle 16, then the fuel nozzle is moved toward the full open position until the peak dynamic pressure level is substantially equal to the overall average peak dynamic pressure level. If the individual peak dynamic pressure level is less than the overall average peak dynamic pressure level for the fuel nozzle, then the fuel nozzle is moved toward the closed position until the individual peak dynamic pressure level is substantially equal to the overall average peak dynamic pressure level.

The fuel modulation system 10 may also prevent drift of the inline modulation valves 12 away from the starting nominal position. In one embodiment, the control module 22 may calculate an average position of the inline modulation valves 12 and compare that value to nominal starting positions of the inline modulation valves 12. The position of the inline modulation valves 12 may be adjusted if the average position of the inline modulation valves 12 is other than equal to the nominal starting position of the inline modulation valve 12. For instance, if the average position of the inline modulation valves 12 is greater than the nominal starting position of the inline modulation valve 12, then the inline modulation valves 12 may be adjusted equally to move the average position downward toward the starting nominal position. In this case, the overall stage fuel control valve 14 will be opened appropriately to maintain the desired stage fuel flow. If the average position of the inline modulation valves 12 is less than the nominal starting position of the inline modulation valve 12, then the inline modulation valves 12 may be adjusted equally to move the average position upward toward the starting nominal position. In this case, the overall stage fuel control valve 14 will be closed appropriately to maintain the desired stage fuel flow.

The fuel modulation system 10 may also include an alarm 24, such as an audible or visual alarm, configured to activate if the average position of the inline modulation valves 12 is outside of an allowable range of valve position. Thus, if the average position of the inline modulation valves 12 is higher than or lower than an upper or lower limit, the alarm will activate. In addition, the fuel modulation system 10 may also be configured such that the alarm 24 will activate if any one of the individual inline modulation valves 12 moves outside of a predetermined allowable range of valve position.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A fuel modulation system for a can-annular turbine engine, comprising:
    at least one overall stage control valve positioned upstream from a turbine fuel manifold in a turbine engine fuel system;
    a plurality of fuel nozzles in fluid communication with the at least one overall stage control valve and down stream of the turbine fuel manifold, wherein the plurality of nozzles are positioned in the fuel system to inject fuel into a plurality of can-annular combustor baskets;
    a plurality of inline modulation valves, wherein one such inline modulation valve is positioned upstream of one of the plurality of fuel nozzles for controlling the fuel flow to each of the fuel nozzles;
    a control module for controlling the inline modulation valves and configured to control opening the inline modulation valves to a substantially fully opened position, modulating the at least one overall stage control valve during startup of the can-annular turbine engine, once the can-annular turbine engine is operating at a load set point, the inline modulation valves are closed at a regulated rate until the inline modulation valves reach a desired nominal position, calculating a peak dynamic pressure level for each of the combustor baskets during a timed period, calculating an average peak dynamic pressure level for all of the combustor baskets, determining whether a combustor basket having a peak dynamic pressure level other than the average peak dynamic pressure level, if the peak dynamic pressure level is greater than the average peak dynamic pressure level for the fuel nozzle, then opening the inline modulation valve for the fuel nozzle until the peak dynamic pressure level is substantially equal to the average peak dynamic pressure level, and if the peak dynamic pressure level is less than the average peak dynamic pressure level for the fuel nozzle, then closing the inline modulation valve for the fuel nozzle until the peak dynamic pressure level is substantially equal to the average peak dynamic pressure level.

2. The fuel modulation system of claim 1, wherein the control module for controlling the inline modulation valves is configured to calculate an average position of the inline modulation valves and compare that value to nominal starting positions of the inline modulation valves.

3. The fuel modulation system of claim 2, wherein the control module for controlling the inline modulation valves is configured to adjust the position of the inline modulation valves if the average position of the inline modulation valves is other than equal to the nominal starting position of the inline modulation valve.

4. The fuel modulation system of claim 3, wherein the control module for controlling the inline modulation valves is configured to adjust the inline modulation valve to move the nominal position downward if the average position of the inline modulation valves is greater than the nominal starting position of the inline modulation valve.

5. The fuel modulation system of claim 3, wherein the control module for controlling the inline modulation valves is configured to adjust the inline modulation valve to move the nominal position upward if the average position of the inline modulation valves is less than the nominal starting position of the inline modulation valve.

6. The fuel modulation system of claim 1, further comprising an alarm configured to actuate if the average position of the inline modulation valves is outside of an allowable range of valve position.

7. A method of modulating fuel flow into fuel nozzles in a can-annular turbine engine, comprising:
    opening an inline modulation valves to a substantially fully opened position;
    modulating the at least one overall stage control valve during startup of the can-annular turbine engine, wherein the can-annular turbine engine comprises at least one overall stage control valve upstream from a turbine fuel manifold in a turbine engine fuel system, a plurality of fuel nozzles in fluid communication with the at least one overall stage control valve, wherein the plurality of nozzles are positioned in the fuel system to inject fuel into a plurality of can-annular combustor baskets, an inline modulation valve upstream of each of the plurality of fuel nozzles for controlling the fuel flow to each of the nozzles, in communication with the at least one overall stage control valve, and downstream from the turbine fuel manifold;

once the can-annular turbine engine is operating at a load set point, the inline modulation valves are closed at a regulated rate until the inline modulation valves reach a desired nominal position;

calculating an average individual peak dynamic pressure level for each of the combustor baskets during a predetermined time period;

calculating an average of the average individual peak dynamic pressure level for all of the combustor baskets;

determining whether a combustor basket has an average peak dynamic pressure level other than the average peak dynamic pressure level of all combustor baskets;

if the individual average peak dynamic pressure level is greater than the average of the individual average peak dynamic pressure levels, then opening the associated inline modulation valve until the individual average peak dynamic pressure level is substantially equal to the overall average peak dynamic pressure level; and if the individual average peak dynamic pressure level is less than the average of the individual average peak dynamic pressure levels, then closing the associated inline modulation valve until the individual average peak dynamic pressure level is substantially equal to the overall average peak dynamic pressure level.

8. The method of claim 7, further comprising calculating an average position of the inline modulation valves and comparing that value to nominal starting positions of the inline modulation valves.

9. The method of claim 8, further comprising adjusting the position of the inline modulation valves if the average position of the inline modulation valves is other than equal to the nominal starting position of the inline modulation valve.

10. The method of claim 9, wherein if the average position of the inline modulation valves is greater than the nominal starting position of the inline modulation valves, then the inline modulation valves are adjusted to move the nominal position downward.

11. The method of claim 9, wherein if the average position of the inline modulation valves is less than the nominal starting position of the inline modulation valves, then the inline modulation valves are adjusted to move the nominal position upward.

12. The method of claim 8, further comprising actuating an alarm if the average position of the inline modulation valves is outside of an allowable range of valve position.

13. The method of claim 7, further comprising actuating an alarm if an average position of a single inline modulation valve is outside of an allowable range of valve position.

14. A method of modulating fuel flow into fuel nozzles in a can-annular turbine engine, comprising:

opening inline modulation valves to a substantially fully opened position;

modulating the at least one overall stage control valve during startup of the can-annular turbine engine, wherein the can-annular turbine engine comprises at least one overall stage control valve upstream from a turbine fuel manifold in a turbine engine fuel system, a plurality of fuel nozzles in fluid communication with the at least one overall stage control valve, wherein the plurality of nozzles are positioned in the fuel system to inject fuel into a plurality of can-annular combustor baskets, an inline modulation valve upstream of each of the plurality of fuel nozzles for controlling the fuel flow to each of the nozzles, in communication with the at least one overall stage control valve, and downstream from the turbine fuel manifold;

once the can-annular turbine engine is operating at a load set point, the inline modulation valves are closed at a regulated rate until the inline modulation valves reach a desired nominal position;

calculating a peak dynamic pressure level for each of the combustor baskets during a timed period;

calculating an average of individual average peak dynamic pressure levels for all of the combustor baskets;

determining whether a combustor basket having an average peak dynamic pressure level other than the average peak dynamic pressure level for all combustor baskets;

if the individual average peak dynamic pressure level is greater than the overall average peak dynamic pressure level, then opening the inline modulation valve for a pilot fuel nozzle until the individual average peak dynamic pressure level is substantially equal to the overall average peak dynamic pressure level;

if the individual average peak dynamic pressure level is less than the overall average peak dynamic pressure level for the pilot fuel nozzle, then closing the inline modulation valve for the pilot fuel nozzle until the individual average peak dynamic pressure level is substantially equal to the overall average peak dynamic pressure level;

calculating an average position of the inline modulation valves and comparing that value to nominal starting positions of the inline modulation valves;

if the average position of the inline modulation valves is greater than the nominal starting position of the inline modulation valves, then the inline modulation valves are adjusted to move the nominal position downward;

if the average position of the inline modulation valves is less than the nominal starting position of the inline modulation valves, then the inline modulation valves are adjusted to move the nominal position upward; and actuating an alarm if the average position of the inline modulation valves is outside of an allowable range of valve position.

* * * * *

UNITED STATES PATENT AND TRADEMARK OFFICE
CERTIFICATE OF CORRECTION

PATENT NO. : 7,654,092 B2  Page 1 of 1
APPLICATION NO. : 11/488562
DATED : February 2, 2010
INVENTOR(S) : Ryan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Twenty-eighth Day of December, 2010

David J. Kappos
*Director of the United States Patent and Trademark Office*